Dec. 8, 1964     K. B. WILSON     3,160,290
SERVO MANIPULATOR ARM

Filed March 19, 1963     3 Sheets-Sheet 1

INVENTOR.
KENTNER B. WILSON
BY
ATTORNEYS

Dec. 8, 1964          K. B. WILSON          3,160,290

SERVO MANIPULATOR ARM

Filed March 19, 1963          3 Sheets-Sheet 3

INVENTOR.
KENTNER B. WILSON
BY
ATTORNEYS

United States Patent Office 3,160,290
Patented Dec. 8, 1964

3,160,290
SERVO MANIPULATOR ARM
Kentner B. Wilson, Orange, Calif., assignor to the United
States of America as represented by the Secretary of the
Air Force
Filed Mar. 19, 1963, Ser. No. 266,462
9 Claims. (Cl. 214—1)

This invention relates generally to the remote handling of materials, and in particular to a servo manipulator approximating the human arm.

Certain materials, for instance, radioactive substances, may require remote handling in order to avoid dangerous contamination. Therefore, servo manipulator devices have been proposed for approximating the configuration of the human arm with its intricate and complex motions about joints at the shoulder, elbow, and wrist. In the past, the angular and rotational motions of arm relative to the joints have been accomplished through a myriad of various gears, racks and pinions, connected at appropriate links and driven by electrical motors. In general, such prior art devices have proven to be quite complicated and cumbersome. Furthermore, the former use of gears has yielded an inherent weakness in the mechanism and has tended, at slow speeds, to transmit uneven, jerky motions. Far superior activation would be available through utilization of the smooth and powerful linear motions afforded between a cylinder and plunger of a fluid ram.

Thus, it is an object of this invention to provide an improved servo manipulator that substantially approximates the configuration and motions of the human arm.

It is an object of this invention to transmit smooth and forceful motion in a servo manipulator arm.

Another object of this invention is to provide a servo manipulator configuration of inherent simplicity, having a minimum of parts, and capable of easy, economical fabrication.

It is a further object to actuate a servo manipulator arm exclusively by the linear motions between cylinders and plungers of fluid rams.

Other objects and a fuller understanding of the invention may be had by referring to the following description and claims, taken in conjunction with the accompanying drawings in which the same numerals refer to corresponding parts and in which:

Figure 1:
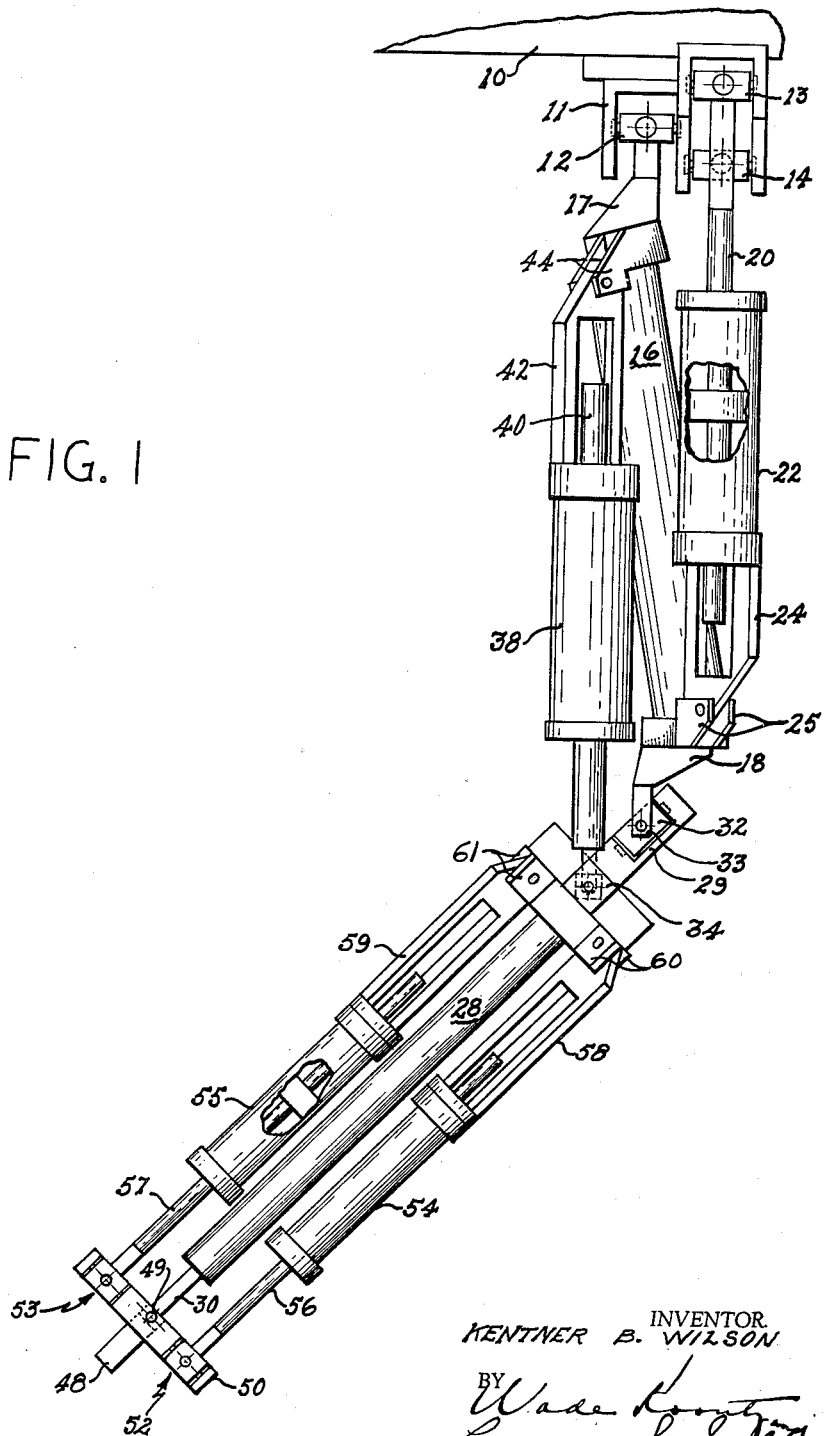
FIGURE 1 is a side view illustrating the servo manipulator arm.
Figure 2:
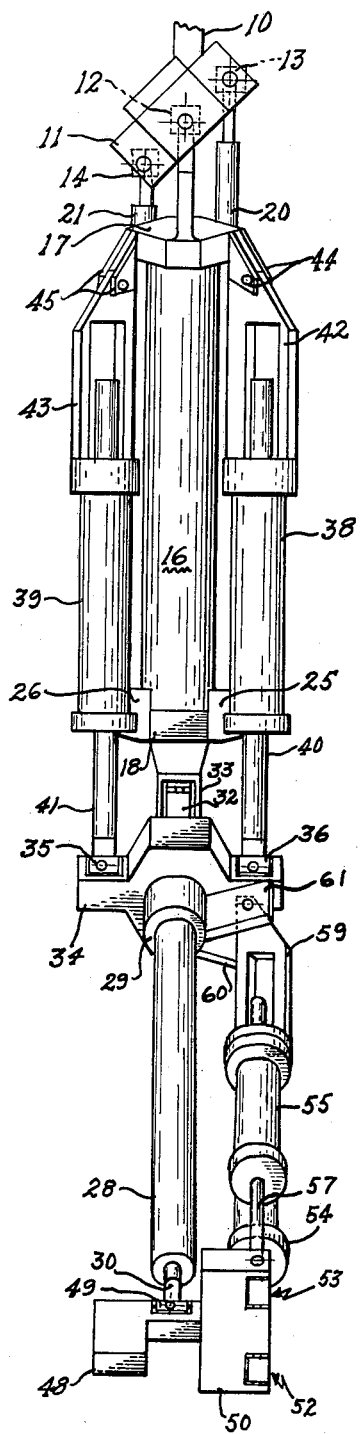
FIGURE 2 is a front view of FIGURE 1.

With reference to the drawings, particularly FIGURES 1 and 2, the supporting base 10 includes a gimbal bearing bracket 11, securely affixed thereto. Bracket 11 may be inclined, as in FIGURE 2, if elevated shoulder motions are desired. Gimbals, with perpendicular double pivots for three dimensional shoulder motions, have been provided at the rectangular blocks 12, 13 and 14. The blocks, each housing a transverse pivot, are mounted within bracket 11 to pivot freely about their longitudinal axes and are positioned, as illustrated, with the shoulder gimbal of block 12 intermediate and forward of the actuator gimbals of blocks 13 and 14.

An upper arm member, corresponding to the human humerus, has been provided by the elongated tube 16, capped at opposite ends by an upper extremity member 17 and a lower extremity member 18. Pivoting the upper extremity 17 on the transverse pivot in block 12, allows the upper arm member to freely swing thereabouts in a manner approximating motions about the ball and socket joint of the human shoulder.

Actuator means, for example, conventional actuator rams powered by pneumatic, hydraulic or magnetic force are available to furnish motive power in a linear direction. The embodiment shown utilizes the smooth and powerful forces furnished by pairs of cooperating fluid actuator rams. Double acting plungers 20 and 21, operating in cylinders 22 and 23, are pivoted, respectively, on the transverse pivots in blocks 13 and 14. As shown, cylinder 22 includes a bracket 24 which is pivoted between the hinge tabs 25 provided in lower extremity 18. In a like manner, cylinder 23 (not visible in FIGURES 1 and 2) is also pivotally connected at the hinge tabs 26 provided in lower extremity 18.

Forearm member 28 terminates at an inner extremity and an outer extremity, indicated generally at 29 and 30, respectively. An elbow gimbal with a pair of perpendicular pivots joining lower extremity 18 to inner extremity 29 is provided at rectangular block 32. As shown, the block 32 is connected to lower extremity 18 by a transverse pivot within yoke 33, and also to inner extremity 29, by a longitudinal pivot in alignment with the forearm 28. In this manner, an elbow joint is formed which allows two dimensional angular motions as well as rolling motions similar to the twisting of the radius about the ulna in the human arm. The cross-link 34, with double pivoting gimbals at blocks 35 and 36, is firmly affixed to inner extremity 29 at a position slightly forward of the elbow gimbal as indicated.

A second pair of fluid actuator rams includes cylinders 38 and 39 together with their associated double acting plungers 40 and 41. The cylinders are pivotally connected by brackets 42 and 43 to hinge tabs 44 and 45 provided at the upper extremity 17. Plungers 40 and 41 are pivotally connected to the cross-link, as shown, through the gimbals provided at blocks 35 and 36.

Adaptor member 48 may be of any convenient shape enabling attachment of a hook, clamp, tool or the like. A gimbal pivot, connecting adaptor 48 to outer extremity 32, has been provided at block 49, which pivots about a double axes to form a wrist-like joint A perpendicular T-shaped link 50 stems from the adaptor 48 as shown. Double pivoting gimbals have been provided in link 50 at the blocks 52 and 53.

A third pair of fluid actuator rams includes the cylinders 54, 55 and the associated double acting plungers 56 and 57. The brackets 58 and 59 extend from cylinders 54 and 55, as shown, to pivot within hinge tabs 60 and 61 provided at one side of cross-link 34. Plungers 56 and 57 extend from within the cylinders to pivot on blocks 52 and 53 respectively.

Operational principles of the invented servo manipulator arm are demonstrated by aid of schematic diagrams, FIGURES 3, 4 and 5. It is well-known that the application of fluid pressure in the various arm cylinders will cause either an extension or a retraction of the actuator rams, and thus, the required motive force is furnished. For the purposes of uncluttered clarity, the necessary fluid supply conduits and source of fluid pressure have not been shown in the figures. However, it is understood that each actuator ram is connected to a source of fluid pressure enabling it to be operated and controlled at a remote location by means of conventional controls. Each actuator may be operated by an individual control or all the arm actuators may be synchronized with a master control for simultaneous motions.

Figure 3A:
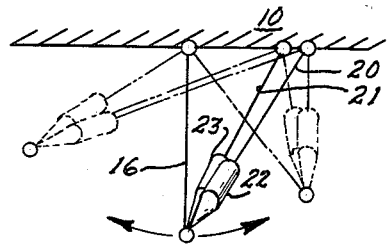
FIGURES 3, 4 and 5 are schematic diagrams illustrating the various motions of the invented configuration.
Figure 3B:
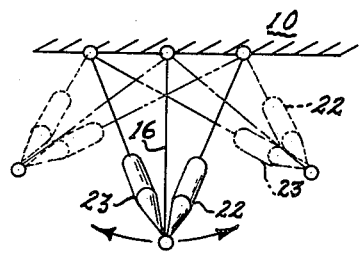

Shoulder motion is illustrated by FIGURES 3A and B, wherein a first pair of actuator rams are indicated at cylinders 22, 23 and plungers 21 and 22. The upper arm member, represented at 16, will be actuated to swing forward by an equal extension of both actuators as indicated in FIGURE 3A. Conversely, an equal retraction will cause a backward swing. FIGURE 3B, a front view of FIGURE 3A, demonstrates that simultaneously retracting the plunger 20 within cylinder 22 while extending the plunger 21 in cylinder 23 will cause the forearm to swing from a vertical to a horizontal, akimbo position. Thus, from the foregoing, it is possible to produce three dimensional motions of the upper arm about the shoulder, solely by means of a pair of actuator rams.

Figure 4A:
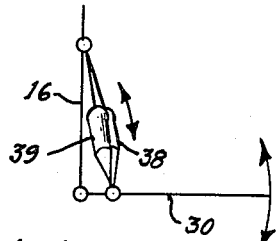
Figure 4B:
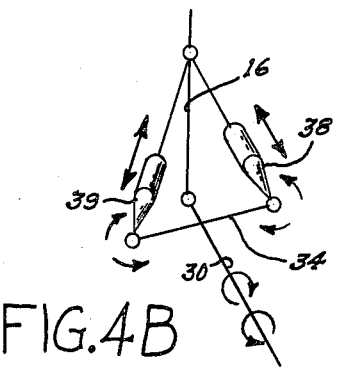

Forearm motions are demonstrated at FIGURES 4A and B. Equal extension and retraction of the second pair of actuator rams, represented at cylinders 38 and 39, results in a two dimensional angular motion of the forearm 30 with respect to the upper arm 16. FIGURE 4B demonstrates that a rolling or twisting motion of the forearm 30 may be accomplished by utilizing cross-link 34 as a moment arm and simultaneously extending one ram while retracting the other.

Figure 5A:
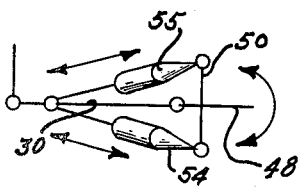
Figure 5B:
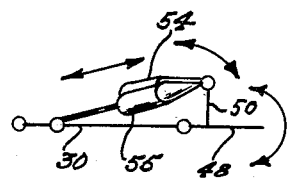

Three dimensional wrist motions are demonstrated in FIGURES 5A and B. A third pair of actuator rams is represented at cylinders 55 and 54. By simultaneously combining the retraction of one cylinder with the extension of the other cylinder, the adaptor 48 will pivot about the end of forearm 30, as shown in the side view at FIGURE 5A. Angular motion in a plane perpendicular to the aforesaid pivoting may be accomplished by equally extending and retracting both rams, as shown in the top view at FIGURE 5B.

Thus, it is evident that motions about joints at the shoulder, elbow and wrist may be effectuated by combining proper extensions and retractions within the appropriate pairs of actuator rams.

Although the invention has been described with reference to a particular embodiment, it will be understood to those skilled in the art that the invention is capable of a variety of alternative embodiments within the spirit and scope of the appended claims.

I claim:

1. A servo manipulator arm comprising: a supporting base; an upper arm member having an extremity pivoted on said base to form a single shoulder joint; a first pair of actuator means pivotally connected between said base and upper arm member for linear extension and retraction therein providing three dimensional arm motion about said shoulder joint; a forearm member having an extremity pivoted on said upper arm member to form a single elbow joint; a second pair of actuator means pivotally connected between said upper arm and forearm members for linear extension and retraction therein providing two dimensional and rolling forearm motions about said elbow joint; an adaptor member pivoted on said forearm to form a wrist joint; and a third pair of actuator means pivotally connected between said forearm and adaptor members for linear extension and retraction therein providing three dimensional motion about said wrist joint.

2. A servo manipulator arm comprising: a supporting base; an upper arm member including an upper and a lower extremity with said upper extremity pivoted on said base to form a single shoulder joint; a first pair of actuator means pivotally connected between said base and lower extremity for linear extension and retraction therein providing three dimensional arm motion about said shoulder joint; a forearm member having an extremity pivoted on said lower extremity to form a single elbow joint; a second pair of actuator means pivotally connected between said upper arm and forearm members for linear extension and retraction therein providing two dimensional and rolling forearm motions about said elbow joint; an adaptor member pivoted on said forearm to form a wrist joint; and a third pair of actuator means pivotally connected between said forearm and adaptor members for linear extension and retraction therein providing three dimensional motion about said wrist.

3. A servo manipulator arm comprising: a supporting base; an upper arm member including an upper and a lower extremity with said upper extremity pivoted on said base to form a single shoulder joint; a first pair of actuator rams pivotally connected between said base and lower extremity for extension and retraction therein providing three dimensional arm motion about said shoulder joint; a forearm member including an inner and an outer extremity with said inner extremity pivoted on said lower extremity to form a single elbow joint; a second pair of actuator rams pivotally connected between said upper extremity and forearm member for linear extension and retraction therein providing two dimensional and rolling forearm motions about said elbow joint; an adaptor member pivoted on said outer extremity to form a wrist joint; and a third pair of actuator rams pivotally connected between said forearm and adaptor members for linear extension and retraction therein providing three dimensional motion about said wrist.

4. A servo manipulator arm comprising: a supporting base; an upper arm member including an upper and a lower extremity with said upper extremity pivoted on said base to form a single shoulder joint; a first pair of spaced fluid rams pivotally connected between said base and lower extremity for extension and retraction therein actuating three dimensional arm motion about said shoulder joint; a forearm member including an inner and an outer extremity with said inner extremity pivoted on said lower extremity to form a single elbow joint; a second pair of spaced fluid rams pivotally connected between said upper and inner extremities for extension and retraction therein actuating two dimensional and rolling forearm motions about said elbow joint; an adaptor member pivoted on said outer extremity to form a wrist joint; and a third pair of spaced fluid rams pivotally connected between said inner extremity and adaptor member for extension and retraction therein providing three dimensional motion about said wrist.

5. A servo manipulator arm comprising: a supporting base; a gimbal pivot mounted in said base; an upper arm member including an upper and a lower extremity with said upper extremity connected at said gimbal pivot to form a single shoulder joint; a first pair of spaced fluid rams pivotally connected between said base and lower extremity for extension and retraction therein actuating three dimensional arm motion about said shoulder joint; a gimbal pivot incorporating a pair of perpendicular pivotal axes mounted in said lower extremity; a forearm member aligned with one of said axes and including an inner and an outer extremity with said inner extremity connected at said gimbal pivot in said lower extremity to form a single elbow joint; a second pair of spaced fluid rams pivotally connected between said upper and inner extremities for extension and retraction therein actuating two dimensional and rolling forearm motions about said elbow joint; a gimbal pivot mounted in said outer extremity; an adaptor member connected at said gimbal pivot in said outer extremity to form a wrist joint; and a third pair of spaced fluid rams pivotally connected between said inner extremity and adaptor member for extension and retraction therein providing three dimensional motion about said wrist.

6. A servo manipulator arm comprising: a supporting base; a gimbal pivot mounted in said base; an upper arm member including an upper and a lower extremity with said upper extremity connected at said gimbal pivot to form a single shoulder joint; a first pair of fluid rams spaced apart about said shoulder joint and pivotally connected between said base and lower extremity for extension and retraction therein actuating three dimensional arm motion about said shoulder joint; a gimbal pivot incorporating a pair of perpendicular pivotal axes mounted at said lower extremity; a forearm member aligned with one of said axes and including an inner and an outer extremity with said inner extremity connected at said gimbal pivot in said lower extremity to form a single elbow joint; a second pair of fluid rams spaced apart and pivotally connected between said upper and inner extremities for extension and retraction therein actuating two dimensional and rolling forearm motions about said elbow joint; a gimbal pivot mounted in said outer extremity; an adaptor member connected at said gimbal pivot in said outer extremity to form a wrist joint; and a third pair of fluid rams spaced apart and pivotally connected between said inner extremity and adaptor member for extension and retraction therein providing three dimensional motion about said wrist.

7. A servo manipulator arm comprising: a supporting base; a gimbal pivot mounted in said base; an upper arm member including an upper and a lower extremity with said upper extremity connected at said gimbal pivot to form a single shoulder joint; a first pair of fluid rams spaced apart about said shoulder joint with said upper arm member therebetween and pivotally connected between said base and lower extremity for extension and retraction therein actuating three dimensional arm motion about said shoulder joint; a gimbal pivot incorporating a pair of perpendicular pivotal axes mounted at said lower extremity; a forearm member aligned with one of said axes and including a cross-link and an inner and an outer extremity with said inner extremity connected at said gimbal pivot in said lower extremity to form a single elbow joint; a second pair of fluid rams spaced apart with said upper arm member therebetween and pivotally connected between said upper extremity and cross-link for extension and retraction therein actuating two dimensional and rolling forearm motions about said elbow joint; a gimbal pivot mounted in said outer extremity; an adaptor member connected at said gimbal pivot in said outer extremity to form a wrist joint, said adaptor having a perpendicular link thereon; and a third pair of fluid rams spaced apart and pivotally connected between said cross-link and perpendicular link for extension and retraction therein providing three dimensional motion about said wrist.

8. A servo manipulator arm comprising: a supporting base; a gimbal pivot mounted in said base; an upper arm member including an upper and a lower extremity with said upper extremity connected at said gimbal pivot to form a single shoulder joint; a first pair of fluid rams spaced apart about said shoulder joint with said upper arm member midway therebetween and having associated plungers and cylinders pivotally connected between said base and lower extremity for extension and retraction therein actuating three dimensional arm motion about said shoulder joint; a gimbal pivot incorporating a pair of perpendicular pivotal axes mounted at said lower extremity; a forearm member aligned with one of said axes and including an inner and an outer extremity with said inner extremity connected at said gimbal pivot in said lower extremity to form a single elbow joint; a cross-link affixed at said inner extremity; a second pair of fluid rams spaced apart with said upper arm member therebetween and having associated plungers and cylinders pivotally connected between said upper extremity and cross-link for extension and retraction therein actuating two dimensional and rolling forearm motions about said elbow joint; a gimbal pivot mounted in said outer extremity; an adaptor member connected at said gimbal pivot in said outer extremity to form a wrist joint, said adaptor member having a perpendicular link thereon; and a third pair of fluid rams spaced apart with said forearm member therebetween and having associated plungers and cylinders pivotally connected between said cross-link and perpendicular link for extension and retraction therein providing three dimensional motion about said wrist.

9. A servo manipulator arm comprising: a supporting base; a pair of actuator gimbals spaced and mounted on said base; a shoulder gimbal mounted in said base at an intermediate and forward position with respect to said actuator gimbals; an upper arm member including an upper and a lower extremity with said upper extremity connected at said shoulder gimbal to form a single shoulder joint; a first pair of fluid rams having associated plungers and cylinders pivotally connected between said actuator gimbals and said lower extremity for extension and retraction therein actuating three dimensional arm motion about said shoulder joint; an elbow gimbal incorporating a pair of perpendicular pivotal axes mounted at said lower extremity; a forearm member aligned with one of said axes and including an inner and an outer extremity with said inner extremity pivoted at said elbow gimbal to form a single elbow joint; a cross-link affixed at said inner extremity; a second pair of fluid rams spaced apart with said upper arm member therebetween and having associated plungers and cylinders pivotally connected between said upper extremity and cross-link for extension and retraction therein actuating two dimensional and rolling forearm motions about said elbow joint; a wrist gimbal mounted in said outer extremity; an adaptor member connected at said wrist gimbal to form a wrist joint, said adaptor having a perpendicular link; and a third pair of fluid rams spaced apart with said forearm member therebetween and having associated plungers and cylinders pivotally connected between said cross-link and perpendicular link for extension and retraction therein providing three dimensional wrist motion.

References Cited by the Examiner

UNITED STATES PATENTS 2,858,947 11/58 Chapman.

FOREIGN PATENTS 847,656 9/60 Great Britain.

HUGO O. SCHULZ, *Primary Examiner.*